W. CADY.
OIL FILTER.

No. 60,685. Patented Jan. 1, 1867.

Witnesses:

Inventor:

United States Patent Office.

WILLIAM CADY, OF MARIETTA, OHIO

Letters Patent No. 60,685, dated January 1, 1867.

---

IMPROVEMENT IN OIL FILTERS.

---

The Schedule referred to in these Letters Patent and making part of the same.

---

TO ALL WHOM IT MAY CONCERN:

Be it known that I, WILLIAM CADY, of Marietta, in the county of Washington, and State of Ohio, have invented a certain new and useful Improvement in Oil Filters, of which the following is a full, clear, and exact description, reference being had to the accompanying drawing, forming part of this specification, and in which—

Figure 1:
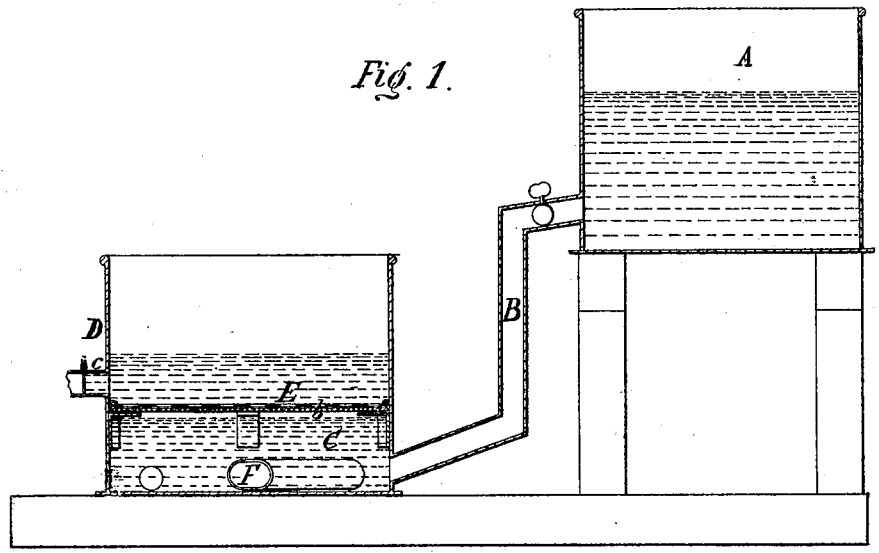
Figure 2:
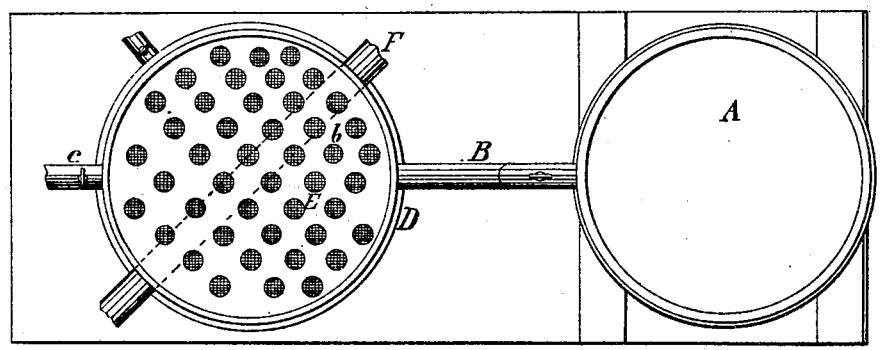

Figure 1 represents a longitudinal vertical section of an oil-filtering device in illustration of my improvement; and Figure 2, a plan of the same.

Like letters of reference indicate like parts in both figures.

In filtering oils, more particularly those required for lubricating purposes, and especially petroleum as pumped from a well, it is important, but has heretofore been a difficult matter to accomplish, that the oil should be freed from all grit, sand, and other earthy matter held in suspension by it, such being apt in lubricating purposes to cut the bearings. Various expedients, including heating of the oil for the purpose of thinning it to aid it in the deposit of sediment, also passing it downwardly through a flannel or cloth filter, have been resorted to, but my improvement essentially differs from all such in the manner of freeing the oil from grit or other objectionable earthy matter; and the nature of my invention consists in a novel process of filtering, more particularly petroleum, by introducing the oil under a head or pressure into a heating chamber containing water, brine, or other suitable fluid, whereby it is diluted or thinned and cut as it were, and from which, by its superior lightness and head or pressure, it is forced or passed upwards through a flannel, cloth, or other equivalent filtering material, thus effectually separating the sand or grit, the natural tendency of which being to fall, the upward course of the oil in filtering is less likely to carry fine grit with it than when the course is a downward one, while this upward filtering action, in combination with heating the oil in its passage to or through the filter, that serves to separate, in a preparatory manner, the sand or grit and to induce its deposit, most effectually secures the desired result.

Referring to the accompanying drawing, A represents a tank or vessel into which the oil may be pumped from the well. B is an eduction pipe therefrom, conveying, under suitable regulation by a faucet, the oil into a lower chamber, C, of a filtering vessel, D, and which is considerably below the level of the tank A. This lower chamber, C, should be more or less filled with water, brine, or other suitable fluid of superior density to the oil, and which, on being heated, serves to thin and, as it were, cut the oil passing upwardly through it, inducing separation and more or less deposit of the sand or grit held in suspension. The upper portion of this chamber, C, has arranged over it a perforated diaphragm, E, faced or covered by flannel, $b$, cloth, or other similar material, through which the thinned or heated oil, more or less freed as described in the chamber, C, from sand or grit, is passed, by its superior lightness and head or pressure to which it is subjected, whereby the grit, by its natural tendency to fall, is more effectually prevented from passing through the cloth in the upward course of the oil there-through than if a downward direction were substituted therefor. The oil thus freed from earthy matter may be run off under suitable regulation, through a faucet or cock, by a pipe, $a$, provided in the upper portion of the vessel D. A pipe and faucet may also be furnished in the chamber C, for clearing out occasionally, as required, said chamber, to free it of grit deposit, and fresh water, brine, or other heating and clearing fluid be supplied to said chamber in any suitable manner. The fluid in the chamber C may be heated or kept heated in different ways, as, for instance, by an outside fire, worm, or steam-pipe, F, connected with a boiler and arranged to pass there-through. Also, if necessary or desirable, a series of two or more perforated diaphragms similar to E, covered as described, may be used, one above the other, for the purpose of still more effectually clearing the oil of earthy impurities.

What I claim as my invention, and desire to secure by Letters Patent, is—

1. The process, substantially as herein described, of filtering or depriving petroleum of its earthy impurities by passing the same under a head or pressure, through a suitably heated medium or fluid of superior density, in an upward course or direction, through a filtering diaphragm or medium, essentially as herein set forth.

2. The combination of the oil tank A, and filtering vessel D, having a lower chamber, C, covered by a filtering cloth or diaphragm, also provided with a suitable heating device or contrivance, and arranged below the level of the tank with which it is connected, substantially as and for the purpose herein set forth.

WM. CADY.

Witnesses:
J. W. COOMBS,
A. LE CLERC.